E. BUEL.
Bee Feeder.
No. 61,514.
Patented Jan. 29, 1867.
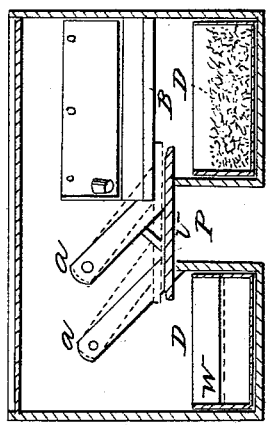
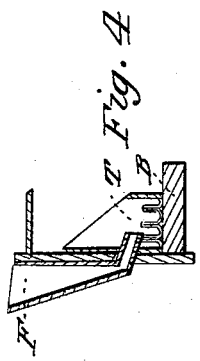
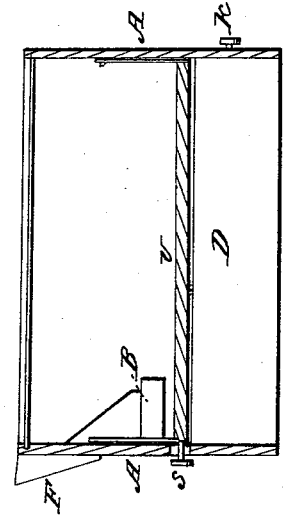
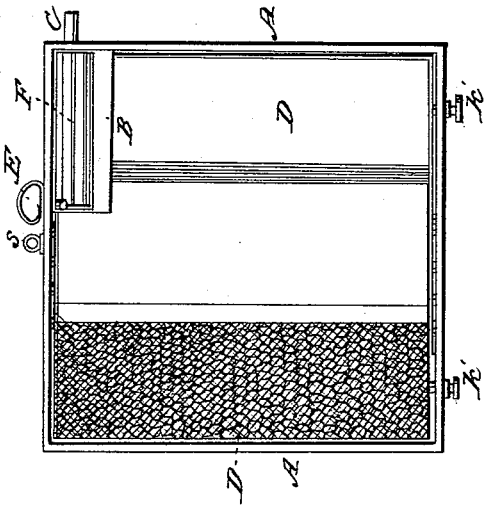
Witnesses:
Inventor:

United States Patent Office.

EBENEZER BUEL, OF SILVER CREEK, NEW YORK.

Letters Patent No. 61,514, dated January 29, 1867.

---

IMPROVEMENT IN BEE-FEEDING APPARATUS.

---

*The Schedule referred to in these Letters Patent and making part of the same.*

---

TO ALL WHOM IT MAY CONCERN:

Be it known that I, EBENEZER BUEL, of Silver Creek, in the county of Chautauqua, in the State of New York, have invented a new and useful "Apparatus for Feeding Honey Bees;" and I do hereby declare that the following is a full, clear, and exact description of the construction and operation of the same, reference being had to the annexed drawings, and to the letters of reference marked thereon, making a part of this specification.

Figure 1 is a plan showing the position of the parts.

Figure 2 is a transverse section.

Figure 3 is a longitudinal elevation; and

Figure 4 is a section showing the construction of the apparatus for introducing and conveying a current of pure water through the apparatus.

The nature of my invention consists in providing an apparatus for conveniently and successfully feeding the honey bee before the opening of flowers in the spring, thus providing stocks of bees poorly supplied with food with a supply at a time when the young brood requires it, and also placing within their reach material on which to work and lay up winter store, or deposit in boxes that may be removed if the bee-keeper deems it not needed for the winter's supply. My apparatus is to be placed on the top of any ordinary bee-hive, after having first provided an aperture through the top board of the hive, about ten inches long by one and a half or two inches wide, by means of which the bees may gain free access into my apparatus, and also allowing the animal heat given off by the swarm below to ascend into it, and thus raise the temperature to such a degree as will enable the bees to work, although the weather may be too cold without for them to do so. Placing the apparatus thus on the top of the hive I do not claim as an original idea, as others have placed dishes of sirup, rye flour, and water in a box on the top of the hive before I invented my apparatus.

To enable others skilled in the art to make and use my invention, I will proceed to describe its construction and operation.

A A A A represent a box of a rectangular plan, being provided with a glass top to admit the light, and with two drawers at the bottom, one on each side of the tube, for the passage of the bees. B represents a board placed in one corner of the box for the support of the trough or spout through which the water flows, and also serving for a lighting board for the bees by means of a small projection beyond the trough. C represents a conduit spout to carry off the surplus water. D D represent two drawers, either of wood or other material, designed, one to contain honey or sirup, and the other rye flour, or any other substitute for pollen, on which the bees are to feed. F represents the funnel of the apparatus for carrying water into the box. K K represent the knobs for handling the drawers. P represents the passage in the tube, by means of which the bees gain access to the apparatus. S represents a set-screw, by means of which the valve is opened and held in position. T represents a trough formed with a ribbed or corrugated bottom, allowing the water to flow through it, giving the bees a chance to work upon it without getting wet. V represents a valve, by means of which the light is excluded from the hive below, and by which the bees may be shut off or allowed to pass up into the feeding apparatus, at the pleasure of the bee-keeper. The valve is shown closed in fig. 2 and fig. 3, but its position when open is represented in fig. 2 by the blue lines. It is so hung by means of strips of metal *a a*, fig. 2, as to preserve a horizontal position when open, and is worked and held in place by means of the set-screw S. W represents a float of perforated paper, prepared by thorough saturation with beeswax, and buoyed up by means of thin slips of cork, or other light material, so that it may not sink in the honey or sirup while the bees are feeding thereon. After finishing all the parts of the apparatus, I cover all the inner surfaces with a coating of beeswax, thus making it easier for bees to pass over all parts of it with facility, and making it more attractive for them. Having placed the apparatus over the aperture in the top of the hive in such a manner as to bring the passage directly over it, and having adjusted a bucket or other vessel containing water in such a position that a minute stream may flow into the funnel, and having filled one of the drawers with honey or sirup, and placed the float thereon, and put a quantity of rye flour into the other, open the valve and admit the bees. Keep the vessel containing water supplied every day, and refill the vessels of feed as often as necessary.

Having thus fully described the nature of my invention, its construction and operation, what I desire to secure by Letters Patent of the United States, is—

1. I claim the drawers D D, for containing material for the bees to feed upon, in combination with the box A.

2. I claim the float W of perforated paper, prepared by saturation with beeswax, and buoyed with cork or other light substance.

3. I also claim the introduction of a current of pure water into the apparatus, or within access of the bees without their passing out of the hive into the open air, either under a float or through a spout with ribbed or corrugated bottom.

4. I also claim the valve V, either arranged as described, or in a fixed position.

5. I also claim the apparatus for conveying water in a continued current within access of the bees in the feeding apparatus.

6. I also claim the coating of my bee-feeding apparatus with beeswax, thus rendering it the better adapted to the habits and tastes of the bee.

7. I also claim, in combination with the box A, the drawers D, the float W of perforated paper, the valve V, the provision for introducing a current of pure water to pass through the apparatus, the apparatus for conveying the water, and the coating of beeswax on all the inner surfaces of the apparatus, when constructed and used for the purposes set forth.

EBENEZER BUEL.

Witnesses:
 WALLACE HAHN,
 DANIEL L. WELLS.